United States Patent
Boström et al.

(10) Patent No.: US 9,210,671 B2
(45) Date of Patent: Dec. 8, 2015

(54) METHODS OF PROVIDING POWER HEADROOM REPORTS ARRANGED IN ORDER OF COMPONENT CARRIER INDICES AND RELATED WIRELESS TERMINALS AND BASE STATIONS

(75) Inventors: Lisa Boström, Solna (SE); Robert Baldemair, Solna (SE); Dirk Gerstenberger, Stockholm (SE); Daniel Larsson, Solna (SE); Henning Wiemann, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 753 days.

(21) Appl. No.: 13/128,122

(22) PCT Filed: Apr. 28, 2011

(86) PCT No.: PCT/SE2011/050526
§ 371 (c)(1),
(2), (4) Date: Nov. 14, 2011

(87) PCT Pub. No.: WO2011/159222
PCT Pub. Date: Dec. 22, 2011

(65) Prior Publication Data
US 2012/0087317 A1   Apr. 12, 2012

Related U.S. Application Data

(60) Provisional application No. 61/356,248, filed on Jun. 18, 2010.

(51) Int. Cl.
*H04W 52/54* (2009.01)
*H04W 52/30* (2009.01)
(Continued)

(52) U.S. Cl.
CPC .............. *H04W 52/54* (2013.01); *H04W 52/30* (2013.01); *H04W 52/346* (2013.01); *H04W 52/367* (2013.01); *H04W 52/34* (2013.01)

(58) Field of Classification Search
None
See application file for complete search history.

(56) References Cited

U.S. PATENT DOCUMENTS

2010/0158147 A1* 6/2010 Zhang et al. ................. 375/260
2010/0296470 A1 11/2010 Heo et al.
(Continued)

FOREIGN PATENT DOCUMENTS

| CN | 101340605 | 1/2009 |
| CN | 101715207 | 5/2010 |

(Continued)

OTHER PUBLICATIONS

European Office Action Corresponding to European Patent Application No. 11 722 607; Dated: Jun. 4, 2013; 5 Pages.
(Continued)

*Primary Examiner* — Christopher Crutchfield
*Assistant Examiner* — Tito Pham
(74) *Attorney, Agent, or Firm* — Myers Bigel Sibley & Sajovec, P.A.

(57) ABSTRACT

Power headroom reports may be transmitted from a wireless terminal to a base station wherein a primary component carrier and at least one secondary component carrier are provided for uplink transmissions from the wireless terminal to the base station and wherein a respective component carrier index is assigned to each of the at least one secondary component carriers provided for the wireless terminal. Respective power headroom reports may be generated for the primary component carrier and for each of the at least one secondary component carriers, and a MAC control element may be generated including the power headroom reports for the primary and secondary component carriers. More particularly, the power headroom reports for each of the at least one secondary component carriers may be arranged in order of the component carrier indices for the respective secondary component carriers. The MAC control element including the power headroom reports for the primary and secondary component carriers may be transmitted from the wireless terminal to the base station over one of the component carriers. Related wireless terminals, and base stations are also discussed.

36 Claims, 10 Drawing Sheets

(51) Int. Cl.
*H04W 52/34* (2009.01)
*H04W 52/36* (2009.01)

(56) References Cited

U.S. PATENT DOCUMENTS

| | | | | |
|---|---|---|---|---|
| 2010/0296471 | A1* | 11/2010 | Heo et al. | 370/329 |
| 2012/0057547 | A1* | 3/2012 | Lohr et al. | 370/329 |
| 2013/0051214 | A1* | 2/2013 | Fong et al. | 370/216 |
| 2013/0153298 | A1* | 6/2013 | Pietraski et al. | 175/45 |

FOREIGN PATENT DOCUMENTS

| | | |
|---|---|---|
| CN | 101729108 | 6/2010 |
| EP | 1 367 739 A1 | 12/2003 |
| EP | 1 628 413 A3 | 1/2007 |
| EP | 1 912 345 A1 | 4/2008 |
| EP | 2 317 815 A1 | 5/2011 |
| EP | 2 582 189 A2 | 4/2013 |
| RU | 2 355 112 C2 | 5/2009 |
| RU | 2008 110 964 A | 9/2009 |
| WO | WO 2009/086188 A2 | 7/2009 |
| WO | WO 2010/051513 A2 | 5/2010 |
| WO | WO 2010/065759 A2 | 6/2010 |
| WO | WO 2010/145508 A1 | 12/2010 |

OTHER PUBLICATIONS

Technical Specification Group Radio Access Network, Release 10, 3GPP TS 36.321 V10.0.0, http://www.3gpp.org, Dec. 2010.
Technical Specification Group Radio Access Network, Release 10, 3GPP TS 36.213 V10.1.0, http://www.3gpp.org, Mar. 2011.
Technical Specification Group Radio Access Network, Release 10, 3GPP TS 36.321 V10.1.0, http://www.3gpp.org, Mar. 2011.
Alcatel-Lucent Shanghai Bell, "Considerations on PHR for CA", *3GPP TSG-RAN WG2 Meeting #70*, R2-102879, May 10-14, 2010, Montreal Canada, 3 pages.
International Search Report and Written Opinion Corresponding to International Application No. PCT/SE2011/050526; Date of Mailing: Aug. 12, 2011; 12 pages.
Nokia Siemens Networks, Nokia Corporation, "Power headroom reporting for uplink carrier aggregation", *3GPP TSG RAN WG1 #61 Meeting*, R1-102946, May 10-14, 2010, Montreal Canada, 4 pages.
Potevio, "Remaining Issues on PHR for CA", *3GPP TSG RAN WG2 #70*, R2-102770, May 10-14, 2010, Montreal Canada, 3 pages.
International Preliminary Report on Patentability Corresponding to International Application No. PCT/SE2011/050526; Date of Completion: Sep. 26, 2012; 14 pages.
3GPP TSG-RAN WG2 #70bis; "Properties of a Cell Index" Tdoc R2-103617; Stockholm, Sweden Jun. 28-Jul. 2, 2010, 2 pages.
3GPP TS 36.213 V9.2.0, $3^{rd}$ Generation Partnership Project; Technical Specification Group Radio Access Network; Evolved Universal Terrestrial Radio Access (E-UTRA); Physical layer procedures (Release 9), Jun. 2010, 80 pages.
Russian Decision on Grant for Russian Patent Application No. 2013102306/07(003059); Dated: Mar. 12, 2015; Foreign Text, 11 Pages, English Translation Thereof, 7 Pages.
Chinese Office Action Corresponding to Chinese Patent Application No. 201180039870; Dated: Mar. 9, 2015; 19 Pages.
Extended European Search Report, EP Application No. 15157508, Jul. 8, 2015, 7 pages.

* cited by examiner

| R | R | PH (Type 2) |
|---|---|---|
| R | R | PH (Type 1) |
| R | R | PH (Type 1) |
| R | R | PH (Type 1) |
| R | R | PH (Type 1) |
| R | R | PH (Type 1) |

*Figure 8*

| R | R | CCI0, PHR (Type 1) |
|---|---|---|
| R | R | CCI1, PHR (Type 1) |
| R | R | CCI2, PHR (Type 1) |
| R | R | CCI2, PHR (Type 2) |
| R | R | CCI3, PHR (Type 1) |
| R | R | CCI4, PHR (Type 1) |

*Figure 9*

| | | | | | | | |
|---|---|---|---|---|---|---|---|
| C$_7$ | C$_6$ | C$_5$ | C$_4$ | C$_3$ | C$_2$ | C$_1$ | R |
| P | V | | PH (Type 2, PCell) | | | | |
| R | R | | P$_{CMAX,c}$ 1 | | | | |
| P | V | | PH (Type 1, PCell) | | | | |
| R | R | | P$_{CMAX,c}$ 2 | | | | |
| P | V | | PH (Type 1, SCell 1) | | | | |
| R | R | | P$_{CMAX,c}$ 3 | | | | |
| ... | | | | | | | |
| P | V | | PH (Type 1, SCell n) | | | | |
| R | R | | P$_{CMAX,c}$ m | | | | |

*Figure 10B*

| | | | | | | | |
|---|---|---|---|---|---|---|---|
| C$_7$ | C$_6$ | C$_5$ | C$_4$ | C$_3$ | C$_2$ | C$_1$ | R |
| R | V | | PH (Type 2, PCell) | | | | |
| R | R | | P$_{CMAX,c}$ 1 | | | | |
| R | V | | PH (Type 1, PCell) | | | | |
| R | R | | P$_{CMAX,c}$ 2 | | | | |
| R | V | | PH (Type 1, Scell 1) | | | | |
| R | R | | P$_{CMAX,c}$ 3 | | | | |
| ... | | | | | | | |
| R | V | | PH (Type 1, Scell n) | | | | |
| R | R | | P$_{CMAX,c}$ m | | | | |

*Figure 10A*

METHODS OF PROVIDING POWER HEADROOM REPORTS ARRANGED IN ORDER OF COMPONENT CARRIER INDICES AND RELATED WIRELESS TERMINALS AND BASE STATIONS

RELATED APPLICATIONS

This application is a 35 U.S.C. §371 national stage application of PCT International Application No. PCT/SE2011/050526, filed on 28 Apr. 2011, which claims the benefit of priority of U.S. Provisional Application No. 61/356,248 entitled "Power Headroom Report (PHR) Identification" filed Jun. 18, 2010. The disclosures of both of the above referenced applications are hereby incorporated herein in their entireties by reference.

BACKGROUND

The present invention relates to communications, and more particularly, to radio communications networks and terminals.

In a typical cellular radio system, wireless terminals (also known as mobile stations and/or user equipment units (UEs)) communicate via a radio access network (RAN) and one or more core networks. User equipment units may include mobile telephones ("cellular" telephones) and/or other processing devices with wireless communication capability, such as, for example, portable, pocket, hand-held, laptop computers, which communicate voice and/or data with the RAN.

The RAN covers a geographical area which is divided into cell areas, with each cell area being served by a base station, e.g., a radio base station (RBS), which in some networks is also called a "NodeB" or enhanced NodeB (eNodeB), which can be abbreviated "eNB." A cell area is a geographical area where radio coverage is provided by the radio base station equipment at a base station site. The base stations communicate over the air interface operating on radio frequencies with UEs within range of the base stations.

In some versions of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for user equipment units.

The Third Generation Partnership Project (3GPP) has undertaken to evolve further the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

FIG. 1 is a simplified block diagram of a Long Term Evolution (LTE) RAN 100. The LTE RAN 100 is a variant of a 3GPP RAN where radio base station nodes (eNodeBs) are connected directly to a core network 130 rather than to radio network controller (RNC) nodes. In general, in LTE the functions of a radio network controller (RNC) node are performed by the radio base stations nodes. Each of the radio base station nodes (eNodeBs) 122-1, 122-2, . . . 122-M communicate with UEs (e.g., UE 110-1, 110-2, 110-3, . . . 110-L) that are within their respective communication service cells. The radio base station nodes (eNodeBs) can communicate with one another through an X2 interface and with the core network 130 through S1 interfaces, as is well known to one who is skilled in the art.

The LTE standard is based on multi-carrier based radio access schemes such as Orthogonal Frequency-Division Multiplexing (OFDM) in the downlink and Discrete Fourier Transform (DFT)-spread OFDM in the uplink. The OFDM technique distributes the data over a large number of carriers that are spaced apart at precise frequencies. This spacing provides the "orthogonality" in this technique which avoids having demodulators see frequencies other than their own. The benefits of OFDM are high spectral efficiency, resiliency to RF interference, and lower multi-path distortion.

FIG. 2 illustrates a resource grid for frequency and time resource elements (REs), where each resource element corresponds to one OFDM subcarrier during one OFDM symbol interval. In the time domain, LTE downlink transmissions may be organized into radio frames of 10 ms, and each radio frame may consist of ten equally-sized subframes of length $T_{subframe}=1$ ms, as illustrated in FIG. 3.

One or more resource schedulers in the LTE RAN 100 allocate resources for uplink and downlink in terms of resource blocks, where a resource block corresponds to one slot (0.5 ms) in the time domain and 12 subcarriers in the frequency domain. Resource blocks are numbered in the frequency domain, starting with 0 from one end of the system bandwidth.

Downlink transmissions are dynamically scheduled. More particularly, in each subframe, the base station transmits control information indicating to which terminals and on which resource blocks the data is transmitted during the current downlink subframe. This control signaling is typically transmitted in the first 1, 2, 3, or 4 OFDM symbols in each subframe. FIG. 4 illustrates a resource grid for a downlink subframe including 3 OFDM symbols on each subcarrier as control region.

The LTE standard uses hybrid-ARQ (hybrid Automatic Repeat reQuest), where, after receiving downlink data in a subframe, the wireless terminal attempts to decode the downlink data, and the wireless terminal reports to the base station whether the decoding was successful (ACK or acknowledge) or not (NAK or negative-acknowledge). In the event of an unsuccessful decoding attempt (i.e., the base station receives a NAK report from the wireless terminal), the base station can retransmit the erroneous data.

Uplink control signaling transmitted from the wireless terminal to the base station may include: (1) hybrid-ARQ acknowledgements for received downlink data; (2) terminal reports related to the downlink channel conditions, used as assistance for the downlink scheduling (also known as Channel Quality Indicator (CQI)); and (3) scheduling requests, indicating that a mobile terminal needs uplink resources for uplink data transmissions. If the mobile terminal has not been assigned an uplink resource for data transmission, the L1/L2 (Layer 1 and/or Layer 2) control information (e.g., including channel status reports, hybrid-ARQ acknowledgements, and/ or scheduling requests) is transmitted in uplink resources (resource blocks) specifically assigned for uplink L1/L2 control information on the Physical Uplink Control Channel (PUCCH). Different PUCCH formats are used for different information. For example, PUCCH formats 1a/1b are used to report hybrid-ARQ feedback, PUCCH Formats 2/2a/2b are used to report of channel conditions, and PUCCH Format 1 is used for scheduling requests.

For a wireless terminal to transmit data over an uplink to a base station, the base station must assign an uplink resource to the wireless terminal on the Physical Uplink Shared Channel (PUSCH), and a PUSCH resource assignment is illustrated in FIG. 5. As shown, a reference signal may be transmitted in the middle SC-symbol in each slot. If the wireless terminal has been assigned an uplink resource for data transmission and at the same time instance has control information to transmit, the wireless terminal will transmit the control information together with the data on the PUSCH.

The LTE Rel-8 standard has recently been standardized, supporting bandwidths up to 20 MHz. 3GPP has initiated work on LTE Rel-10 to support bandwidths greater than 20 MHz and to support other requirements defined by IMT-Advanced Requirements. Another requirement for LTE Rel-10 is to provide backward compatibility with LTE Rel-8, including spectrum compatibility. This requirement may cause an LTE Rel-10 carrier to appear as a number of LTE carriers to an LTE Rel-8 terminal. Each such carrier can be referred to as a Component Carrier (CC) or as a cell. For early LTE Rel-10 deployments, it can be expected that there will be a smaller number of LTE Rel-10-capable terminals compared to many LTE legacy terminals. Therefore, it may be important to provide efficient use of the wide carrier by legacy terminals, such as by enabling legacy terminals to be scheduled in all parts of the wideband LTE Rel-10 carrier. One way to obtain this may be by means of Carrier Aggregation. Carrier Aggregation refers to an LTE Rel-10 terminal being configured to receive multiple CCs, where each CC has, or at least has the possibility to have, the same structure as a Rel-8 carrier. The same structure as Rel-8 implies that all Rel-8 signals, e.g. (primary and secondary) synchronization signals, reference signals, system information, etc. are transmitted on each carrier. FIG. 6 graphically illustrates an exemplary 100 MHz Carrier Aggregation of five 20 MHz CCs.

Referring to FIG. 6, the number of aggregated CCs as well as the bandwidth of the individual CC may be different for uplink and downlink. A symmetric configuration refers to the case where the number of CCs in downlink and uplink is the same, whereas an asymmetric configuration refers to the case that the numbers of CCs in downlink and uplink are different. It is important to note that the number of CCs offered by the network may be different from the number of CCs seen by a terminal. For example, a terminal may support more downlink CCs than uplink CCs, even though the network offers the same number of uplink and downlink CCs.

Uplink power control is used both on the PUSCH and on PUCCH. The purpose is to provide that the mobile terminal transmits with sufficiently high power but not too high power since the latter may increase interference to other users in the network. In both cases, a parameterized open loop combined with a closed loop mechanism may be used. Roughly, the open loop part may be used to set a point of operation, around which the closed loop component may operate. Different parameters (targets and 'partial compensation factors') for user and control plane may be used. For further description of PUSCH and PUCCH power control, see sections 5.1.1.1 of 3GPP 36.213, Physical Layer Procedures.

To control the UE's (User Equipment's) UL (Uplink) power, the eNB (Evolved Node B) base station may use TPC (Transmission Power Control) Commands which will order the UE (User Equipment) to change its transmission power either in an accumulated or absolute fashion. In LTE Rel-10, the UL power control is managed per Component Carrier. As in Rel-8/9 PUSCH and PUCCH power control is separate. In LTE Rel-10, the PUCCH power control will only apply to the Primary Component Carrier (PCC) since this is the only UL CC configured to carry PUCCH.

Because the UE does not provide ACK/NACK responses to TPC commands from the eNB base station, the eNB base station cannot be sure that the TPC commands are received by the UE. Because the UE may falsely decode the PDCCH as including a TPC command, counting used TPC commands cannot be used to reliably estimate a current output power from the UE. In addition, the UE may also compensate its power level autonomously (based on path-loss estimates), and these autonomous adjustments may be unknown to the eNB base station. For these reasons, the eNB base station may need to receive PHR (Power Headroom Report) reports regularly to make competent scheduling decisions and control the UE UL power.

Accordingly, the UE may be required to compute Power Headroom Reports for each component carrier being used for uplink transmissions from the UE to the eNB. Notwithstanding known techniques of reporting power headroom, there continues to exist a need for improved power headroom reporting providing increased efficiency.

SUMMARY

According to some embodiments, power headroom reports may be transmitted from a wireless terminal to a base station, wherein a primary component carrier and at least one secondary component carrier are provided for uplink transmissions from the wireless terminal to the base station, and wherein a respective component carrier index is assigned to each of the at least one secondary component carriers provided for the wireless terminal. Respective power headroom reports may be generated for the primary component carrier and for each of the at least one secondary component carriers, and a MAC control element may be generated including the power headroom reports for the primary and secondary component carriers. Moreover, the power headroom reports for each of the at least one secondary component carriers may be arranged in order of the component carrier indices for the respective secondary component carriers. The MAC control element including the power headroom reports for the primary and secondary component carriers may be transmitted from the wireless terminal to the base station over one of the component carriers.

By transmitting power headroom reports for different component carriers in a single MAC control element over one of the component carriers, communications resources required to transmit the power headroom reports may be reduced. For example, the single MAC control element may require only a single header/address field when communicating all of the power headroom reports, while separate MAC control elements with respective separate header/address fields may be required if power headroom reports for different component carriers are transmitted separately. Moreover, by transmitting all of the power headroom reports in one MAC control element, power headroom reporting may be provided on any available resource on any available component carrier without having to wait for an available resource on a particular component carrier to transmit a power headroom report for that component carrier. In addition, separate identifications of the power headroom reports may be omitted from the PHR MAC control element by using component carrier indices known to both the wireless terminal and the base station to order the power headroom reports in the MAC control element that is transmitted from the wireless terminal to the base station. Accordingly, communications resources required for power headroom reporting may be further reduced.

According to some other embodiments, power headroom reports may be received at a base station from a wireless terminal. A primary component carrier and at least one secondary component carrier may be provided for uplink communications from the wireless terminal to the base station, and a respective component carrier index may be assigned to each of the at least one secondary component carriers provided for the wireless terminal. A MAC control element including power headroom reports for the primary and secondary component carriers may be received from the wireless terminal over one of the component carriers. Each of the power headroom reports of the MAC control element may be associated with a respective one of the primary and/or secondary component carriers based on an order in which the power headroom reports are arranged in the MAC control element and based on the component carrier indices assigned to each of the at least one secondary component carriers.

According to still other embodiments, a wireless terminal may include a processor and a transceiver coupled to the processor. The processor may be configured to generate information for uplink transmissions provided over a primary component carrier and at least one secondary component carrier from the wireless terminal to a base station, and a respective component carrier index may be assigned to each of the at least one secondary component carriers provided for the wireless terminal. The processor may be further configured to generate respective power headroom reports for the primary and secondary component carriers, and to generate a MAC control element including the power headroom reports for the primary and secondary component carriers with the power headroom reports for each of the at least one secondary component carriers being arranged in order of the respective component carrier indices. The transceiver may be configured to transmit the MAC control element including the power headroom reports for the primary and secondary component carriers from the wireless terminal to the base station over one of the component carriers.

According to yet other embodiments, a base station may include an assignment processor and RF circuitry coupled to the assignment processor. The assignment processor may be configured to provide a primary component carrier and at least one secondary component carrier for uplink communications from the wireless terminal to the base station, and a respective component carrier index may be assigned to each of the at least one secondary component carriers provided for the wireless terminal. The RF circuitry may be configured to receive a MAC control element including power headroom reports for the primary and secondary component carriers from the wireless terminal (110-1) over one of the component carriers. The assignment processor (732) may be further configured to associate each of the power headroom reports of the MAC control element with a respective one of the primary and/or secondary component carriers based on an order in which the power headroom reports are arranged in the MAC control element and based on the component carrier indices assigned to the secondary component carriers.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings:

FIGS. 8 and 9 are diagrams illustrating orderings of power headroom reports of a PHR control element according to some embodiments;

FIGS. 10A and 10B are diagrams illustrating orderings of power headroom reports of extended PHR control elements according to some embodiments;

DETAILED DESCRIPTION

The invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
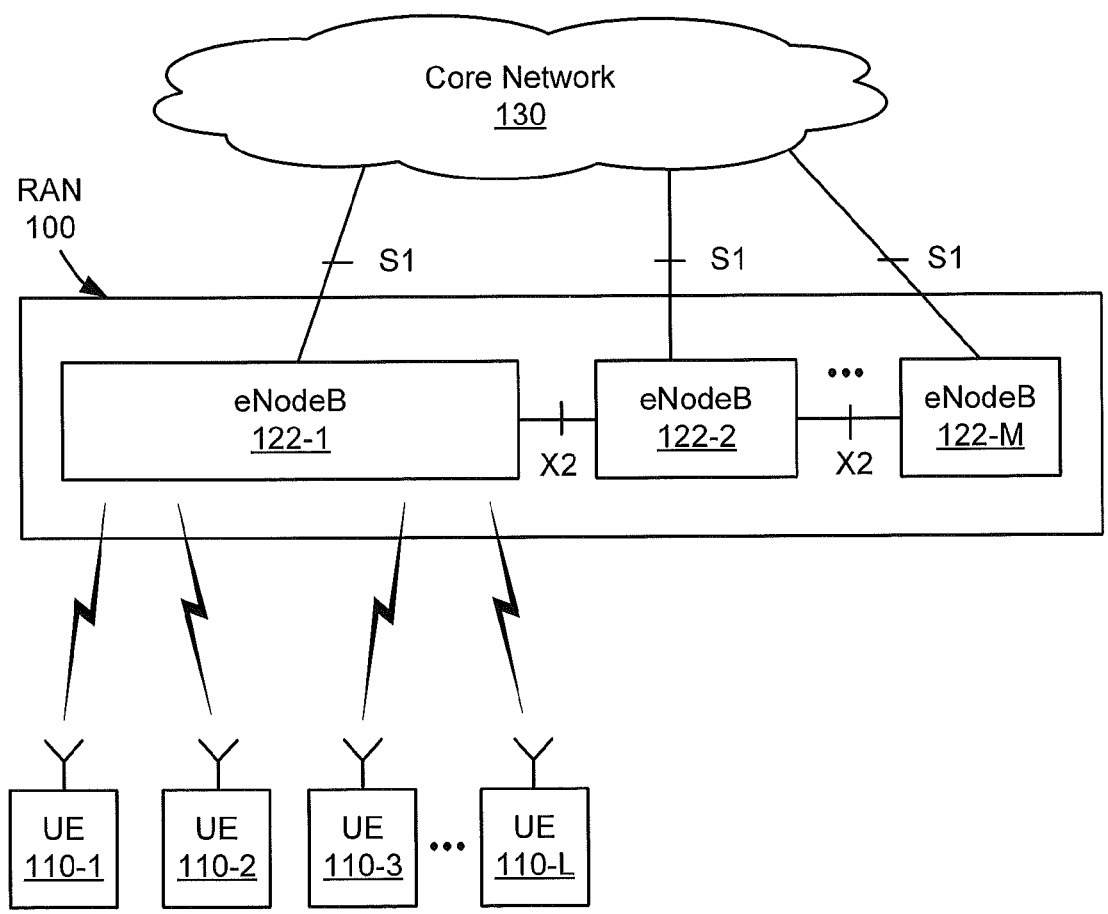
FIG. 1 is a block diagram of a LTE RAN.

For purposes of illustration and explanation only, various embodiments of the present invention are described herein in the context of operating in a LTE RAN, such as the RAN 100 of FIG. 1. It will be understood, however, that the present invention is not limited to such embodiments and may be embodied generally in any type of RAN that is configured to transmit and/or receive according to one or more RATs (Radio Access Technologies).

In LTE Rel-8, the eNB base station may configure the UE to send power headroom reports periodically or when the change in pathloss exceeds a certain configurable threshold. The power headroom reports indicate how much transmission power the UE has left for a subframe I (i.e., the difference between the nominal UE maximum transmit power and the estimated required power). According to some embodiments, the reported value may be in the range of 40 to −23 dB, where a negative value shows that the UE did not have enough power to conduct the transmission. According to some embodiments, a power headroom report may include 6-bits defining one of 64 different values corresponding to the 64 different values between and including 40 dB and −23 dB.

The eNB base station uses PHR reports as inputs to its resource scheduler. Based on the available power headroom for an uplink (UL) component carrier (CC), the resource scheduler will choose a number of PRBs (Physical Resource Blocks), an MCS (Modulation and Coding Scheme), and a suitable transmit power adjustment command (TPC) for that uplink (UL) component carrier (CC). In carrier aggregation, the eNB base station would make these evaluations per UL (UpLink) CC (Component Carrier) because power is controlled per CC according to RAN1 decisions. Stated in other words, the eNB base station resource scheduler may choose numbers of PRBs, MCSs, and/or TPC commands separately for each CC configured/activated for the UE based on a power headroom report(s) for that CC, and/or based on a power headroom report(s) for that CC and one or more other CCs configured/activated for the UE.

Because UL power control is provided separately per CC and separately for PUSCH and PUCCH, separate PHR reporting may be required for each CC (e.g., for each primary and secondary component carrier), and separate PHR reporting may be required for PUSCH and PUCCH for the primary component carrier PCC. For Rel-10, there will be two types of PHR reports:

Type 1 power headroom reports computed as:

$P_{cmax,c}$ minus PUSCH power, or $(P_{cmax,c} - P_{PUSCH})$;

Type 2 power headroom reports computed as:

$P_{cmax,c}$ minus PUCCH power minus PUSCH power, or $(P_{cmax,c} - P_{PUCCH} - P_{PUSCH})$.

In these equations, $P_{cmax,c}$ is the configured output power for the respective component carrier for which the power headroom level is being calculated. Detailed formulas for power headroom calculations are defined in 3GPP TS 36.213, V10.1.0, Evolved Universal Terrestrial Radio Access (E-UTRA), Physical Layer Procedures, Release 10, March, 2011.

Secondary Component Carriers (SCCs) may report Type 1 PHR without reporting Type 2 PHR, because SCCs are not configured for PUCCH. A Primary Component Carrier (PCC), however, may report both Type 1 and Type 2 PHRs. Type 1 and Type 2 PHRs may be reported in the same subframe because both reports may be needed to gain understanding of the UL (UpLink) PCCs total power headroom. In an alternative, Type 1 and Type 2 PHRs for a PCC may be reported in different subframes.

Applying a Rel-8 framework for Power Headroom Reporting (PHR) to Carrier Aggregation (CA), a PHR for a specific component carrier may be sent on the component carrier for which it is reporting. A PHR, however, may only be transmitted on a component carrier if the terminal has PUSCH resources granted on that component carrier.

In Rel-10, a PHR for one component carrier may be transmitted on another component carrier. This may enable rapid reporting of path loss changes on one component carrier as soon as the terminal has PUSCH resources granted on any configured UL component carrier. More specifically, a path loss change by more than dl-PathlossChange dB on any component carrier may trigger transmission of a PHR on any (the same or another) component carrier for which the terminal has PUSCH resources granted.

In LTE Rel-8, all MAC (Medium Access Control) CEs (Control Elements) relate to the particular carrier the UE is operating on. With the introduction of Carrier Aggregation in Rel-10, it may be useful to associate the information contained in a MAC CE with a particular component carrier.

If a PHR is transmitted on a CC other than the one it is reporting for (as may occur in Rel-10), the eNB base station may be unable to distinguish which CC the PHR is reporting on/for. Accordingly, it may be difficult for the eNB base station to use the PHR to calculate the UE pathloss for the particular CC. Accordingly, the eNB may need to identify a CC with which a power headroom report is associated when the power headroom report is transmitted on a CC other than the CC for with which it is reporting.

Figure 7:
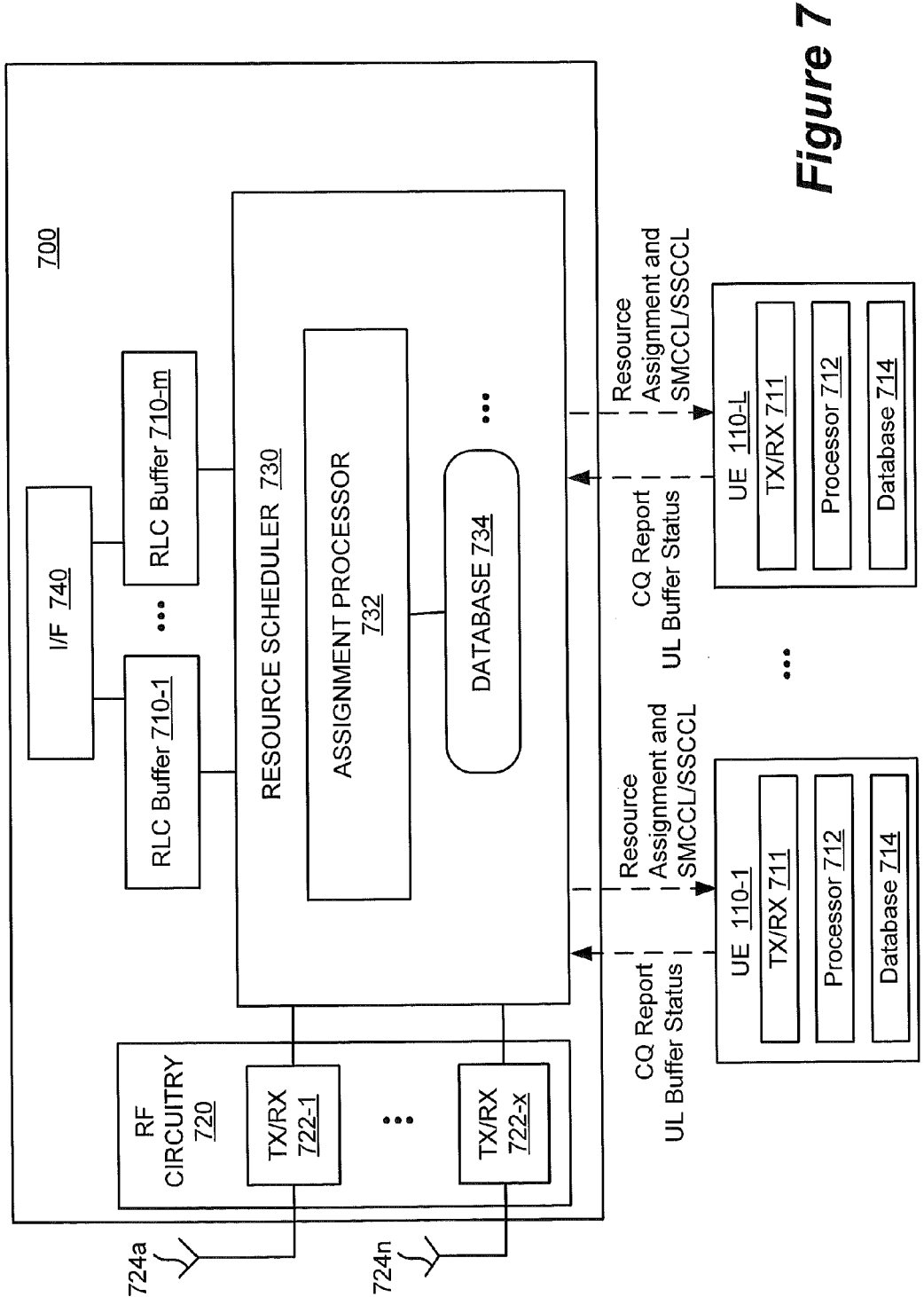
FIG. 7 is a block diagram of a portion of a RAN and a plurality of UEs that are configured according to some embodiments.

FIG. 7 is a block diagram of a portion of a network node 700 and UEs 110-1 to 110-L that are configured according to some embodiments of the present invention. The network node 700 may be provided as one or more of the radio base station nodes (eNodeBs) of FIG. 1. Stated in other words, network node 700 may be a base station network node. Referring to FIG. 7, the network node 700 includes a resource scheduler 730 that can include a resource element assignment processor 732 and database 734. The assignment processor 732 may include one or more data processing and memory circuits, such as a general purpose and/or special purpose processor (e.g., microprocessor and/or digital signal processor) with on-board and/or separate memory device. The assignment processor 732 is configured to execute computer program instructions from a memory device, described below as a computer readable medium, to configure/deconfigure/activate/deactivate component carriers (including primary and/or secondary component carriers or CCs) to the UEs 110-1 to 110-L and communicate those assignments thereto.

Figure 2:
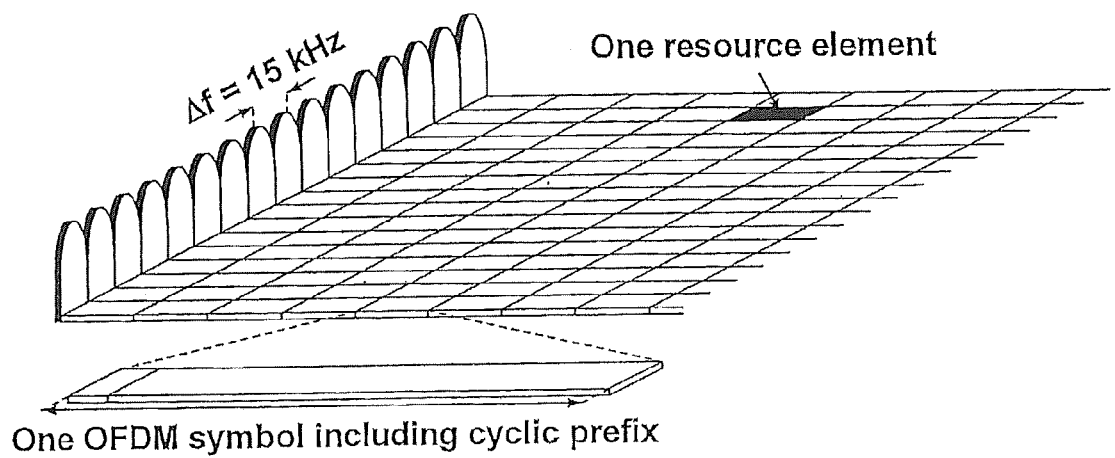
FIG. 2 illustrates a conventional resource grid of frequency and time resource elements that can be scheduled for communication use between a network node and UEs.
Figure 3:
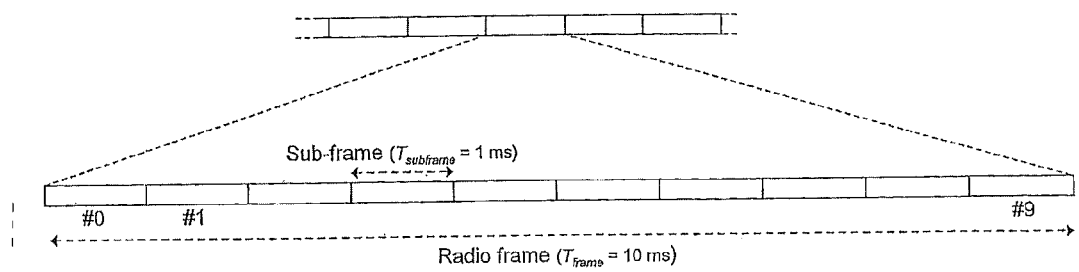
FIG. 3 illustrates an example of an LTE downlink radio frame that is divided into subframes.
Figure 4:
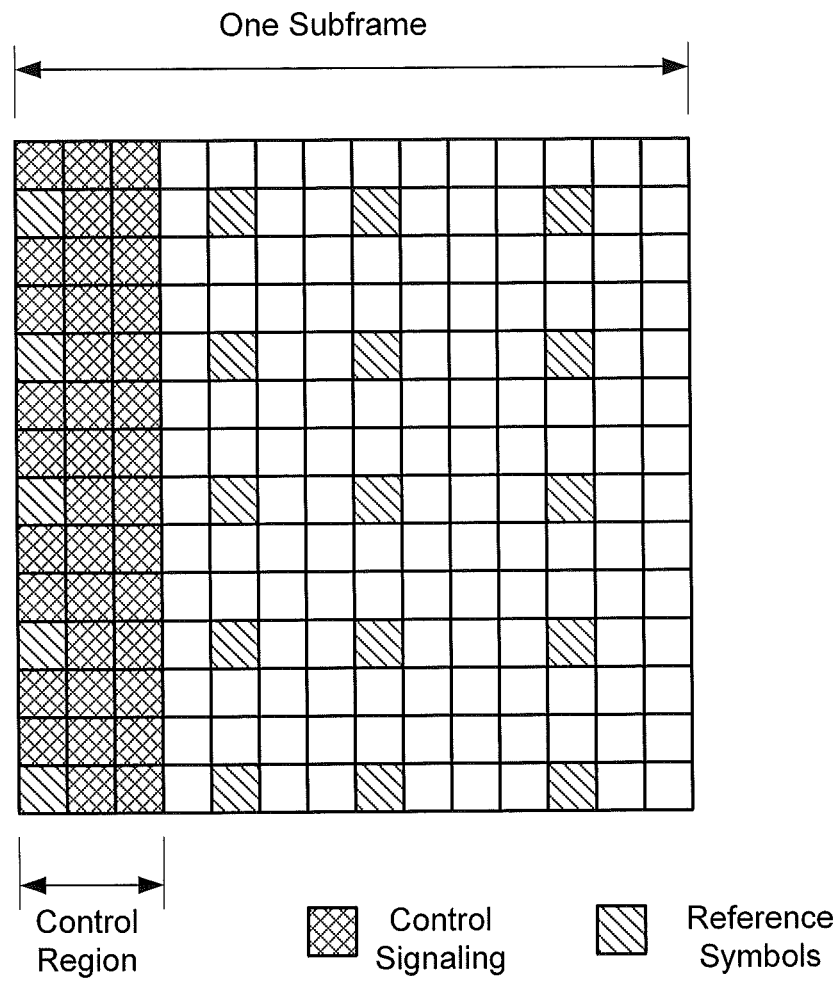
FIG. 4 illustrates an example of a resource grid for a downlink subframe including 3 OFDM symbols on each subcarrier as control region.
Figure 6:
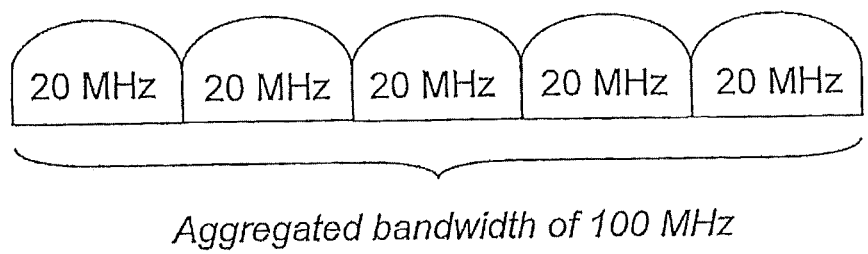
FIG. 6 illustrates an example of Carrier Aggregation of Component Carriers.
Figure 5:
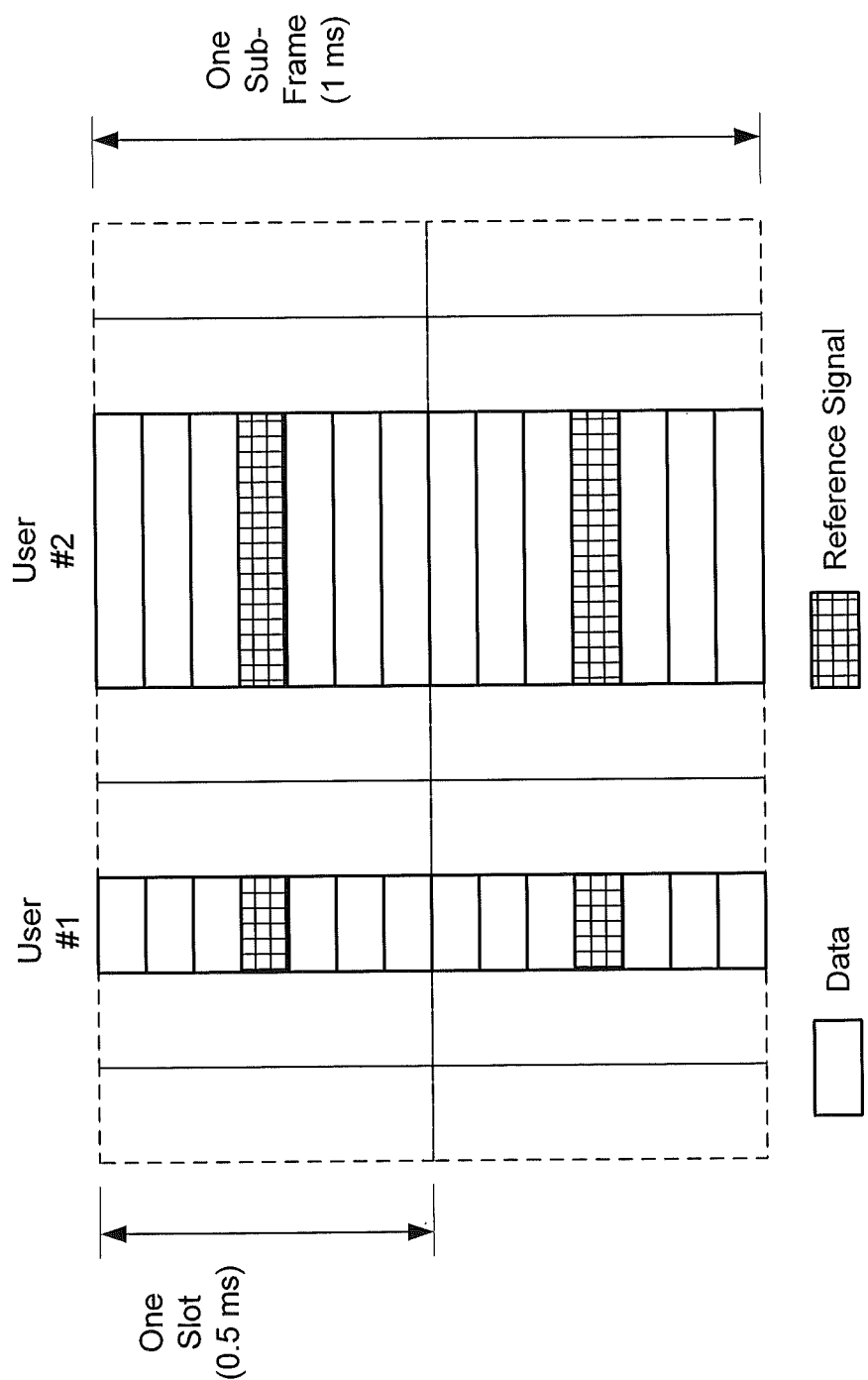
FIG. 5 illustrates an example of a PUSCH resource assignment.

The network node 700 includes RF circuitry 720 having a plurality of transceivers (TX/RX) 722-1 to 722-*x* that communicate using different frequency subcarriers through antennas 724*a-n* to provide the exemplary multiple carrier portion of the resource grid shown in FIG. 2. Although an exemplary one-to-one mapping of transceivers to antennas is shown, it is to be understood that any number of antennas and/or transceivers may be used depending upon antenna configuration and design constraints.

The network node 700 can also include a plurality of radio link control (RLC) protocol buffers 710-1 to 710-M where downlink data, that is received from the core network 130, via the interface (I/F) 740, is buffered awaiting transmission to addressed UEs. The assignment processor 732 can use RLC Buffer information to identify which UEs require assignment of resource elements and determine how many resource elements to assign to those UEs.

Each of the UEs 110-1 to 110-L may include transceiver (TX/RX) 711, processor 712, and database 714. Transceiver 711 may communicate with network node 700 through RF circuitry 720 using the different frequency component carriers to support the exemplary multiple carrier portion of the resource grid shown in FIG. 2. Processor 712 may include one or more data processing and memory circuits, such as a general purpose and/or special purpose processor (e.g., microprocessor and/or digital signal processor) with on-board and/or separate memory device. The processor 712 may be configured to execute computer program instructions from a memory device, described below as a computer readable medium, to generate and transmit power headroom reports as discussed in greater detail below. Database 714 can contain a listing of secondary component carriers that have been configured/activated for the UE by the assignment processor 732 and respective component carrier indices used to identify the secondary component carriers that have been configured/activated.

Assignment processor 732 of network node 700 may configure and/or activate primary and/or secondary component carriers for uplink transmissions from UE 110-1 to network node 700, and each of the configured and/or activated component carriers for UE 110-1 may be assigned a unique component carrier index known to both the assignment processor 732 and to UE 110-1. For example, assignment processor 732 may assign a component carrier index each time a primary or secondary component carrier is configured and/or activated for UE 110-1, and the component carrier index may be transmitted to UE 110-1 when the respective component carrier is configured and/or activated for UE 110-1. Database 734 may thus maintain a listing of configured/activated primary and/or secondary component carriers for each UE together with a component carrier index assigned to the component carriers for each UE.

According to some other embodiments, a component carrier index for each configured/activated primary and/or secondary component carrier for UE 110-1 may be determined by an order in which the configured/activated component carriers were configured/activated for UE 110-1. Assignment processor 732 and UE processor 712 may thus independently determine the same component carrier indices for each of the configured/activated component carriers without requiring transmission of the component carrier indices between network node 700 and UE 110-1.

No matter how component carrier indices are determined/assigned for UE 110-1, UE 110-1 database 714 and resource scheduler 730 database 734 are both able to identify all configured/activated component carriers for UE 110-1 using the respective component carrier indices. Because a secondary component carrier may be configured/activated by assignment processor 732 for multiple UEs at the same time, different component carrier indices may be used to identify the same secondary component carrier for different UEs at the same time.

According to some embodiments, assignment processor 732 may configure/activate a primary component carrier (PCC) and a plurality of secondary component carriers (SCCs) for uplink communications from UE 110-1 to network node 700, and power headroom reports (PHRs) for all of the configured/activated primary and secondary component carriers may be transmitted in a same Medium Access Control (MAC) Control Element (CE) over one of the configured/activated component carriers. By providing the component carrier indices for each primary and/or secondary component carrier that is configured/activated for UE 110-1, the power headroom reports for the primary and/or secondary component carriers may be ordered within the MAC CE according to the respective component carrier indices for the component carriers associated with the power headroom reports. Accordingly, the power headroom reports may be provided in one MAC control element without requiring separate identifications for the component carriers to be transmitted therewith. Moreover, assignment processor 732 can associate the power headroom reports with the respective component carriers using the order based on the known indices.

The indexing (also referred to as ordering) of CCs based on the CC indices (also referred to as cell indices), that are known to both UE 110-1 and the eNB base station network node 700, may be used to identify the power headroom reports instead of requiring specific identifiers for each of the power headroom reports in the MAC control element (CE) used to forward the PHRs. Indexing/ordering of CCs per UE may be used for CC management. The indexed UL CCs could either comprise all configured UL CCs or all configured/activated UL CCs or even all UL CCs offered in the same frequency band or eNB base station network node 700 as long as a unique CC index is assigned for each CC that is configured for a specific UE.

With PHR identification based on a CC index known by both UE 110-1 and the eNB base station network node 700, a Type 1 PHR may be generated and transmitted for each UL CC (e.g., for the PCC and for each SCC), and in addition, a Type 2 PHR may be generated and transmitted for the UL PCC. The PHR reports from all UL CCs (e.g., for the UL PCC and for each UL SCC) may be stacked (within the same MAC CE) in the index order starting with the Type 2 PHR from the UL PCC and then adding all the Type 1 PHRs in order based on the value order of the UL CC index. Alternative indexing/ordering schemes can be envisioned as well. A distinguishing aspect of some embodiments may be that all PHRs may be stacked within the same MAC CE transmitted on a single one of the UE UpLink CCs.

Since eNB network node 700 will know how many UL CCs it has configured/activated for a specific UE, node 700 may implicitly know the number of rows (e.g., octets) to expect in the PHR MAC CE. The PHR MAC CE may thus include a single subheader row (e.g., octet) identifying the CE as a PHR MAC CE (using a Logical Channel Identification or LCID) followed by a row (e.g., octet) for each PHR (e.g., a Type 1 PHR for each PCC and SCC and a Type 2 PHR for the PCC only). By transmitting one PHR MAC CE including the PHRs for all component carriers over one of the component carriers, only one CE header/subheader is required.

FIG. 8 is a diagram illustrating an ordering of power headroom reports within a control element (e.g., a MAC CE) transmitted from UE 110-1 to network node 700, according to some embodiments. As shown in FIG. 8, the Type 2 PHR for the PCC may be provided first, and then, for all UL CCs (including the PCC and all SCCs) reporting PHR for this UE in this Transmission Time Interval (TTI), Type 1 PHRs may be added according to a CC index/order (e.g. the CIF or Carrier Indicator Field value) in a specific order (e.g. in consecutive order either starting with the lowest or the highest index). All PHRs (both Type 1 and Type 2) for a UE UpLink may thus be transmitted in a same Control Element (CE) on a same component carrier (CC) with only one header row followed by one row for each PHR.

While not shown in FIG. 8, the CE may begin with a subheader row or rows (e.g., an octet including a 5 bit Logical Channel IDentification or LCID identifying the CE as providing power headroom reports), and the eNB base station network node 700 will know that the first PHR (provided as a first 8 bit octet following the header) is a Type 2 PHR for the PCC, and it will also know the index/order for each CC and will thus be able to tell for all the consecutive PHR reports (provided as subsequent 8 bit octets in the same Control Element) which PHR reports are associated with which CC. A PHR MAC CE may thus be a data block including sequential rows (e.g., octets) starting with a subheader row or rows followed by the PHR rows and transmitted over a same CC.

According to some embodiments, the Type 2 PHR may be included first (following the subheader row or rows) and then Type 1 PHRs for all activated UL CCs may be added in consecutive order according to CC index. The eNB base station network node 700 would then know that the order of the Type 1 PHRs will correspond to the index order of the configured/activated UL CCs. This embodiment may be suitable when an explicit activation/deactivation mechanism is provided in the system. According to still other embodiments, the Type 2 PHR may be ordered after the Type 1 PHRs have been ordered according to their CC index following the subheader row or rows.

According to yet other embodiments, the PHRs may be ordered independent of the type, according to the CC index. Because the UE knows the CC indices, the UE knows exactly which row corresponds to which CC. For the PCC, two 8 bit rows may be reserved, with the first row for the PCC Type 1 PHR and with the second row for PCC Type 2 PHR (or the other way around). As shown FIG. 9, the CC indices are {CCI0, CCI1, CCI2, CCI3, CCI4} provided in sorted order. Furthermore, CCI2 is CC index assigned to the PCC in the embodiment of FIG. 9. As discussed above, the PHR MAC CE may have an initial subheader row or rows (not shown) including an LCID and followed by the illustrated rows for each PHR.

Each PHR may thus occupy an 8 bit row of a MAC CE that is transmitted on one of the CCs, and R represents a reserved bit (e.g., reserved for future use). Accordingly, each PHR may only use 6 of the bits in the respective 8 bit row to represent a power headroom level having one of 64 different values (e.g., representing values of 40 dB to −23 dB). Moreover, a size of the MAC CE used to transmit the PHRs may vary depending on a number of SCCs allocated to the UE. According to some embodiments, a communications uplink UL from UE 110-1 to eNB base station network node 700 may require one PCC, and 0 to 4 SCCs may be configured/activated for the uplink according to bandwidth requirements. A power headroom report (provided from UE 110-1 to eNB base station network node 700) as discussed above with respect to FIGS. 8 and 9 may thus include: two rows for the PCC Type 1 and Type 2 PHRs when the uplink includes only a PCC; two rows for the PCC Type 1 and Type 2 PHRs and one row for one Type 1 PHR for one SCC when a single SCC is configured/activated; two rows for the PCC Type 1 and Type 2 PHRs and two rows for two Type 1 PHRs for two SCCs when two SCCs are configured/activated; two rows for the PCC Type 1 and Type 2 PHRs and three rows for three Type 1 PHRs for three SCCs when a three SCCs are configured/activated; and two rows for the PCC Type 1 and Type 2 PHRs and four rows for four Type 1 PHRs for four SCCs when four SCCs are configured/activated. Because both UE 110-1 and eNB base station network node 700 know the number of CCs assigned to the UpLink and both UE 110-1 and eNB base station network node 700 know the index/order to be use for PHRs in a PHR MAC CE, UE 110-1 can prepare and transmit the PHR MAC CE in a format that can be received and understood at eNB base station network node 700.

According to some embodiments illustrated in FIGS. 10A and 10B, each power headroom report (PHR) of an extended PHR MAC control element may include a 6-bit power headroom level (PH) and a 6-bit configured output power ($P_{CMAX,c}$) that is used to calculate the respective power headroom level (PH). As discussed above, the power headroom level may use 6 bits of an 8 bit row to represent a power headroom level having one of 64 different values (e.g., representing values of 40 dB to −23 dB). In addition, a status row (including elements $C_1$ to $C_7$) may be provided to indicate an activation/deactivation status of each secondary component carrier. In embodiments of FIGS. 10A and 10B, a primary component carrier (PCC) may be referred to as a PCell, a secondary component carrier (SCC) may be referred to as an SCell, and a component carrier index may be referred to as a cell index. In addition, a component carrier index may be referred to as a ServCellIndex (having a possible value of 0 to 7) used to identify the PCC and each SCC, and an SCellIndex may be a subset of ServCellIndex (having a possible value of 1 to 7) used to identify each SCC. In other words, ServCellIndex=0 may be the index used to identify the PCC for UE 110-1, and ServCellIndex (or SCellIndex)=1 to 7 may be the indices used to identify SCCs for UE 110-1. Extended power headroom MAC control elements are discussed, for example, in Section 6.1.3.6a (entitled "Extended Power Headroom MAC Control Element") of $3^{rd}$ Generation Partnership Project; Technical Specification Group Radio Access Network; Evolved Universal Terrestrial Radio Access (E-UTRA); Medium Access Control (MAC) Protocol Specification (Release 10); 3GPP TS 36.321, V10.0.0 (2010-12), and in Section 6.1.3.6a (entitled "Extended Power Headroom MAC Control Element") of $3^{rd}$ Generation Partnership Project; Technical Specification Group Radio Access Network; Evolved Universal Terrestrial Radio Access (E-UTRA); Medium Access Control (MAC) Protocol Specification (Release 10); 3GPP TS 36.321, V10.1.0 (2011-03). The disclosures of the above referenced specifications are hereby incorporated herein in their entireties by reference.

In embodiments of FIGS. 10A and 10B, each power headroom report may include up to two 8-bit rows (or octets), with 6-bits of the first row used to provide a power headroom level (PH), and with 6-bits of the second row used to provide a configured output power ($P_{CMAX,c}$) used to calculate the associated power headroom level. In addition, a V-bit (also referred to as an indicator bit) may be provided with each power headroom level where the V-bit is used to indicate whether the respective power headroom level (including in the same row/octet) is based on a real transmission or on a reference format. For a Type-1 power headroom level, a first value of V (e.g., V=0) indicates that the respective power headroom level is based on a real transmission over PUSCH, and a second value of V (e.g., V=1) indicates that the respective power headroom level is based on a PUSCH reference format. For a Type-2 power headroom level, the first value of V (e.g., V=0) indicates that the respective power headroom level is based on a real transmission over PUCCH, and the second value of V (e.g., V=1) indicates that the respective power headroom level is based on a PUCCH reference format. If V has the second value indicating the that the respective power headroom level is based on a reference format (and not on an real transmission), the second row/octet of the associated power headroom report may be omitted because a configured output power ($P_{CMAX,c}$) is not provided/needed for a power headroom level that is based on a reference format. Accordingly, a first value of V (e.g., V=0) may indicate that the associated power headroom report includes two rows/octets providing a power headroom level (PH) based on a real transmission and a configured output power ($P_{CMAX,c}$), while a second value of V (e.g., V=1) may indicate that the associated power headroom report includes only one row/octet providing a power headroom level (PH) based on a reference format. As noted above, R designates a bit that is reserved for future use, and the R bits may be set to zero.

In embodiments of FIGS. 10A and 10B, the primary component carrier may be designated with an index of 0, and up to seven secondary component carriers may be configured/activated with respective indices of 1 to 7. In addition, a row/octet including bits $C_1$ to $C_7$ may be provided to identify an activation/deactivation status of each of the secondary component carriers (also referred to as SCells), and bits $C_1$ to $C_7$ may be respectively associated with power headroom levels for respective first through seventh secondary component carriers. If no secondary CCs are configured/activated for UE 110-1, then $C_1=C_2=C_3=C_4=C_5=C_6=C_7=0$. If one secondary CC is configured/activated for UE 110-1, but second through seventh CC's are not configured/activated for UE 110-1, then $C_1=1$, and $C_2=C_3=C_4=C_5=C_6=C_7=0$. If first and second secondary CCs are configured/activated for UE 110-1, but third through seventh CC's are not configured/activated for UE 110-1, then $C_1=C_2=1$, and $C_3=C_4=C_5=C_6=C_7=0$. If first through third secondary CCs are configured/activated for UE 110-1, but third through seventh CC's are not configured/activated for UE 110-1, then $C_1=C_2=C_3=1$ and $C_4=C_5=C_6=C_7=0$. If first through fourth secondary CCs are configured/activated for UE 110-1, but fifth through seventh CC's are not configured/activated for UE 110-1, then $C_1=C_2=C_3=C_4=1$ and $C_5=C_6=C_7=0$. If first through fifth secondary CCs are configured/activated for UE 110-1, but sixth and seventh CC's are not configured/activated for UE 110-1, then $C_1=C_2=C_3=C_4=C_5=1$ and $C_6=C_7=0$. If first through sixth secondary CCs are configured/activated for UE 110-1, but seventh CC is not configured/activated for UE 110-1, then $C_1=C_2=C_3=C_4=C_5=C_6=1$ and $C_7=0$. If seven secondary CCs are configured/activated for UE 110-1, then $C_1=C_2=C_3=C_4=C_5=C_6=C_7=1$.

While not shown in FIGS. 10A and 10B, an additional row(s)/octet(s) may be provided at the beginning of the control element with a 5 bit LCID as discussed above. As shown in FIGS. 10A and 10B, the control element may include both a Type 1 power headroom report (including PH(Type1, PCell) and $P_{CMAX,c}2$) and a Type 2 power headroom report (including PH(Type2,PCell) and $P_{CMAX,c}2$) for the primary component carrier. According to other embodiments, portions of the control element for the primary component carrier may include only a Type 1 power headroom report (including PH(Type1, PCell) and $P_{CMAX,c}2$), and a Type 2 power headroom report (including PH(Type2,PCell) and $P_{CMAX,c}1$) for the primary component carrier may be omitted. In FIG. 10B, P designates a bit that may be used to indicate whether the UE applies an additional power backoff due to power management. The UE may set P=1 if the corresponding $P_{CMAX,c}$ would have had a different value if no additional power management had been applied.

Figure 11:
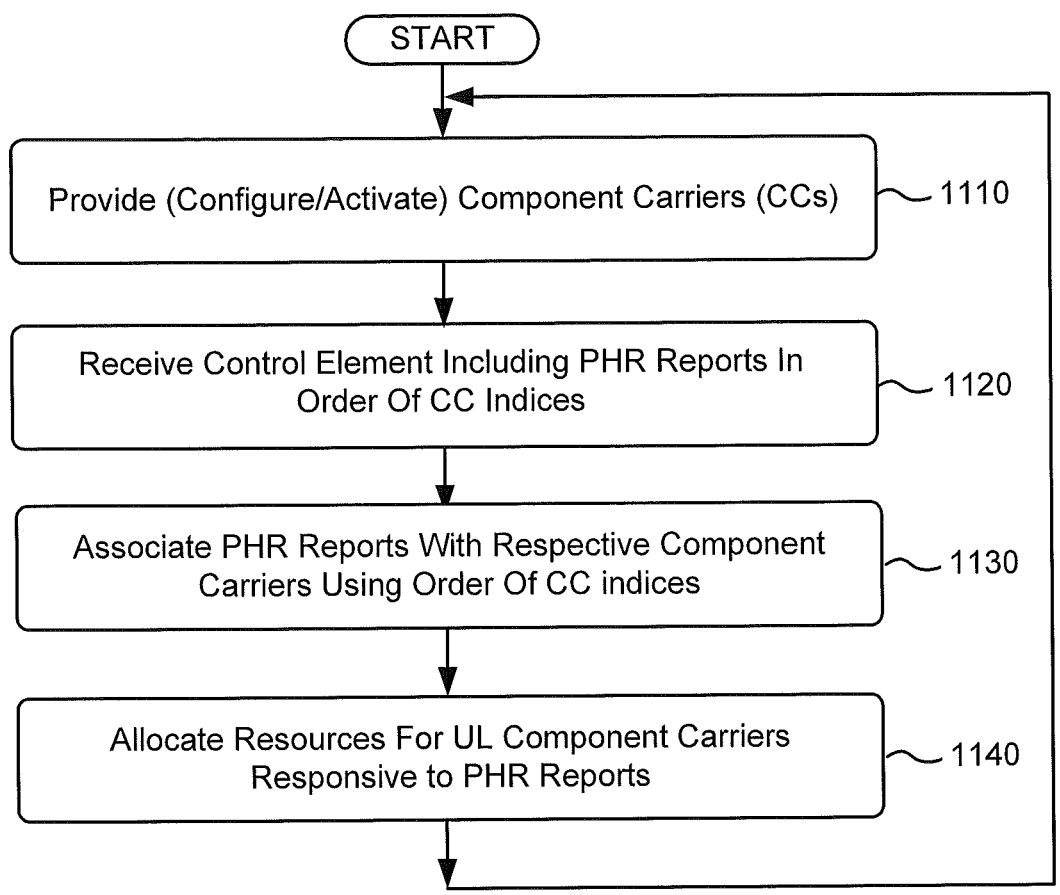
FIGS. 11 and 12 are flow charts illustrating operations of base station network nodes according to some embodiments.

FIG. 11 is a flow chart illustrating operations of a base station network node 700 according to some embodiments. At block 1110, assignment processor 732 may provide one or more uplink component carriers for uplink communications from wireless terminal UE 110-1 to base station network node 700. More particularly, assignment processor 732 may provide (e.g., assign/configure/activate) a primary component carrier (PCC) and a plurality of secondary component carriers (SCCs) for uplink communications from the wireless terminal to the base station, and a respective secondary component carrier index may be assigned to each of the secondary component carriers provided for the wireless terminal.

At block 1120, base station network node 700 may receive a MAC control element including power headroom reports for the primary and secondary component carriers from the wireless terminal over one of the component carriers through RF circuitry 720. More particularly, the power headroom reports for the secondary component carriers may be arranged in the control element in order of the component carrier indices for the respective secondary component carriers. Accordingly, assignment processor 732 can associate each of the power headroom reports with a respective component carrier that is assigned/configured/activated for the wireless terminal that transmitted the MAC control element at block 1130 using the order of CC indices.

Responsive to receiving the MAC control element including the power headroom reports, assignment processor 732 may allocate resources for the primary component carrier and/or the secondary component carriers at block 1140. For example, assignment processor 732 may choose a number of physical resource blocks (PRBs), assign modulation coding schemes (MCS), and/or choose a suitable transmit power adjustment command (TPC) for one or more of the primary and/or secondary component carriers responsive to respective power headroom reports for the particular component carriers. More particularly, assignment processor 732 may allocate resources for one or more primary and/or secondary component carriers responsive to the respective power headroom reports for the primary and/or secondary component carriers received in the control element.

Figure 12:
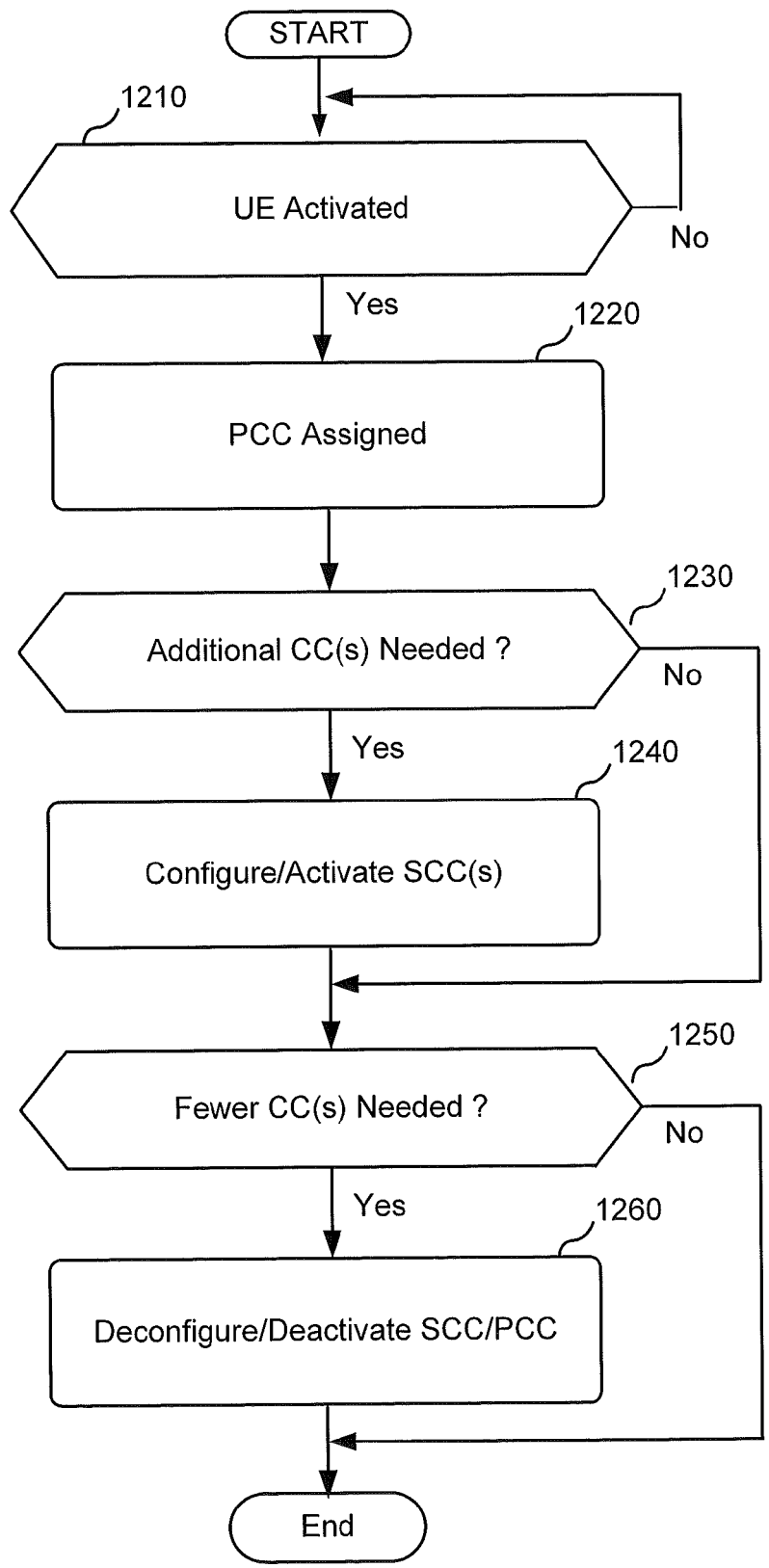

Operations of providing component carriers from block 1110 of FIG. 11 will now be discussed in greater detail with respect to the flow chart of FIG. 12. At block 1210, assignment processor 732 may determine if the UE 110-1 has been activated for communications with base station 700, and responsive to activation of UE 110-1, assignment processor 732 may assign a primary component carrier (PCC) for wireless terminal UE 110-1 at block 1220. When the primary component carrier is configured/activated for UL transmissions from wireless terminal UE 110-1, database 734 may create a file for wireless terminal UE 110-1, and the file may identify the PCC for wireless terminal UE 110-1 together with an index (e.g., 0) for the PCC. Once a primary component carrier has been configured/activated for wireless terminal UE 110-1 at block 1210, assignment processor 732 may determine at block 1230 if additional component carriers are needed for wireless terminal UE 110-1. If an additional component carrier(s) is needed at block 1230, assignment processor may configure/activate one or more secondary component carriers for wireless terminal UE 110-1 at block 1240. If fewer component carrier(s) are needed for wireless terminal UE 110-1 at block 1250, assignment processor may deconfigure/deactivate one or more secondary and/or primary component carriers at block 1260.

As component carriers are configured/activated at blocks 1220 and/or 1240 and/or deconfigured/deactivated at block 1250, the wireless terminal UT 110-1 is informed (via transmission from RF circuitry 720) so that the wireless terminal UT 110-1 can take any action needed to configure/activate and/or deconfigure/deactivate component carriers. Moreover, for each configured/activated component carrier, wireless terminal UT 110-1 database 714 may create a record identifying the configured/activated CC for wireless terminal UE 110-1 together with an index (e.g., an index of 0 for the PCC, and an index of 1 to 7 for each of the SCCs). Database 714 of wireless terminal UT 110-1 and database 734 of base station network node 700 may thus identify the same assigned/configured/activated CCs for wireless terminal UT 110-1, and databases 714 and 734 may associate the same indices with the configured/activated CCs for wireless terminal UE 110-1. As noted above, a unique CC index is provide for each secondary component carrier configured/activated for UE 110-1. When a same secondary component carrier is configured/activated by assignment processor 732 for first and second UEs at the same time, however, assignment processor 732 and the first UE may use a first index to identify the shared secondary component carrier as used by the first UE, and the assignment processor 732 and the second UE may use a second index to identify the shared secondary component carrier as used by the second UE.

Figure 13:
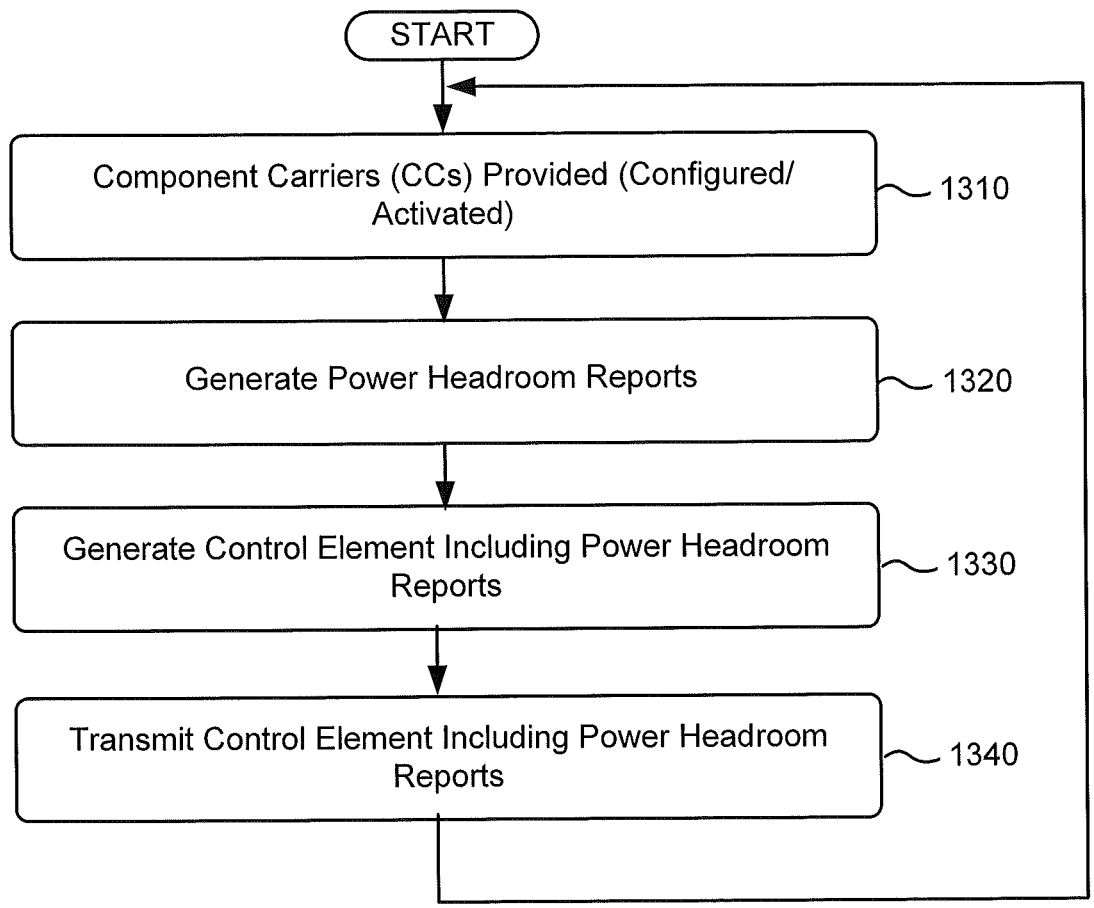
FIG. 13 is a flow chart illustrating operations of wireless terminals according to some embodiments.

FIG. 13 is a flow chart illustrating operations of wireless terminal UT 110-1 according to some embodiments. At block 1310, wireless terminal UT 110-1 processor 712 and/or transceiver 711 may provide a primary component carrier (PCC) and a plurality of secondary component carriers (SCCs) for uplink transmissions from wireless terminal UT 110-1 to base station network node 700 responsive to instruction from assignment processor 732 of base station network node 700 (e.g., responsive to instruction from an eNB). For example, a respective secondary component carrier index may be assigned to each of the secondary component carriers provided for the wireless terminal UT 110-1, and component carriers may be configured/activated and indices may be assigned responsive to operations of base station network node 700 discussed above with respect to FIG. 12 and operations of block 1110 of FIG. 11. At block 1320, processor 712 may generate respective power headroom reports for the primary component carrier and for each of the secondary component carriers, and at block 1330, processor 712 may generate a control element (e.g., a MAC control element) including the power headroom reports for the primary and secondary component carriers. For example, the power headroom reports for the secondary component carriers may be arranged in order of the component carrier indices for the respective secondary component carriers. Wireless terminal UT 110-1 may then transmit the control element including the power headroom reports for the primary and secondary component carriers through transceiver 711 and RF circuitry 720 to resource scheduler 730 of base station network node 700 over one of the component carriers at block 1340. Moreover, the power headroom reports for the secondary component carriers may be arranged in the control element in order of the component carrier indices for the respective secondary component carriers. According to some embodiments, component carrier indices may be assigned to primary and secondary component carriers, and the power headroom reports for the primary and secondary component carriers may be arranged in the control element in order of the component carrier indices. Because there will always be a primary component carrier with secondary component carriers being optional, the primary component carrier may be assigned an index (e.g., a lowest index) that always places power headroom report for the primary component carrier first in the ordering of power headroom reports. According to some embodiments, an index for the primary component carrier may not be required because every PHR MAC control element may include a power headroom report for the primary component carrier in a known location, but power headroom reports for secondary component carriers may only be included when respective secondary component carriers are provided for the UE. Accordingly, a PHR MAC control element may include a power headroom report for the primary component carrier (without requiring an assignment of a component carrier index for the primary component carrier) followed by power headroom reports for any secondary component carriers in order of component carrier indices for the secondary component carriers.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Exemplary embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various exemplary combinations and sub combinations of embodiments and of the manner and process of making and using them, and shall support claims to any such combination or sub combination.

Many variations and modifications can be made to the embodiments without substantially departing from the principles of the present invention. All such variations and modifications are intended to be included herein within the scope of the present invention.

That which is claimed is:

1. A method of transmitting power headroom reports from a wireless terminal to a base station, wherein a primary component carrier and at least one secondary component carrier are provided for uplink transmissions from the wireless terminal to the base station, wherein a respective component carrier index is assigned to each of the at least one secondary component carriers provided for the wireless terminal, the method comprising:
generating respective power headroom reports for the primary component carrier and for each of the at least one secondary component carriers;
generating a MAC control element including the power headroom reports for the primary and secondary component carriers, wherein a Type 2 and Type 1 power headroom reports for the primary component carrier are provided first, and then Type 1 power headroom reports for each of the at least one secondary component carriers are arranged in an order according to the component carrier indices for the respective secondary component carriers, and wherein no specific component carrier identifier field is included for each of the Type 1 power headroom reports for each of the at least one secondary component carriers; and
transmitting the MAC control element including the power headroom reports for the primary and secondary component carriers from the wireless terminal to the base station over one of the component carriers.

2. A method according to claim 1 wherein the Type 1 power headroom report for each of the primary and secondary component carriers includes a Type 1 power headroom level for a physical uplink shared channel of the respective component carrier in the MAC control element.

3. A method according to claim 2 wherein the Type 2 power headroom report for the primary component carrier includes a Type 2 power headroom level of the primary component carrier in the MAC control element.

4. A method according to claim 3 wherein the Type I power headroom level is computed as P_cmax,c minus PUSCH power, and wherein the Type 2 power headroom level is computed as P_cmax,c minus PUCCH power minus PUSCH power.

5. A method according to claim 1 wherein each of the at least one secondary component carriers are configured and/or activated for uplink transmissions from the wireless terminal to the base station.

6. A method according to claim 1 wherein the Type 1 power headroom reports for each of the at least one secondary component carriers are ordered in consecutive order according to the component carrier indices for the respective secondary component carriers.

7. A method according to claim 6 wherein the Type 2 power headroom report for the primary component carrier precedes the Type 1 power headroom reports for the primary component carrier and each of the at least one secondary component carriers in the MAC control element, wherein the Type 1 power headroom reports for each of the at least one secondary component carriers are arranged in ascending order according to the component carrier indices for the respective secondary component carriers.

8. The method of claim 1 wherein the at least one secondary component carrier includes first and second secondary component carriers, wherein the MAC control element begins with an eight bit header octet including a five bit Logical Channel Identification (LCID) identifying the MAC control element as providing power headroom reports, wherein the Type 2 power headroom report for the primary component carrier is provided in a first eight bit octet of the MAC control element following the header octet, wherein the Type 1 power headroom report for the primary component carrier is provided in a second 8 bit octet of the MAC control element following the header octet after the Type 2 power headroom report for the primary component carrier, wherein a Type 1 power headroom report for the first secondary component carrier is provided in a third eight bit octet of the MAC control element following the header octet after the Type 1 power headroom report for the primary component carrier, and wherein a Type 1 power headroom report for the second secondary component carrier is provided in a fourth eight bit octet of the MAC control element following the header octet after the Type 1 power headroom report for the first secondary component carrier, and wherein no specific component carrier identifier and no component carrier index is included in the eight bit octets for the Type 1 power headroom reports.

9. The method of claim 8 wherein the MAC control element includes only the eight bit header octet followed by the first eight bit octet for the Type 2 power headroom report for the primary component carrier, the second eight bit octet for the Type 1 power headroom report for the primary component carrier, and respective eight bit octets for each of the Type 1 power headroom reports for the respective secondary component carriers.

10. A method of receiving power headroom reports at a base station from a wireless terminal, the method comprising:

providing a primary component carrier and at least one secondary component carrier for uplink communications from the wireless terminal to the base station, wherein a respective component carrier index is assigned to each of the at least one secondary component carriers provided for the wireless terminal;

receiving a MAC control element including power headroom reports for the primary and secondary component carriers from the wireless terminal over one of the component carriers, wherein a Type 2 and Type 1 power headroom reports for the primary component carrier are provided first, and then Type 1 power headroom reports for each of the at least one secondary component carriers are arranged in an order according to the component carrier indices for the respective secondary component carriers, and wherein no specific component carrier identifier field is included for each of the Type 1 power headroom reports for each of the at least one secondary component carriers; and associating each of the Type 1 power headroom reports of the MAC control element with a respective one of the primary and/or secondary component carriers based on an order in which the Type 2 power headroom reports are arranged in the MAC control element and based on the component carrier indices assigned to the primary component carrier and each of the at least one secondary component carriers.

11. A method according to claim 10 wherein the Type 1 power headroom report for each of the primary and secondary component carriers includes a Type 1 power headroom level for a physical uplink shared channel of the respective component carrier in the MAC control element.

12. A method according to claim 11 wherein the Type 2 power headroom report for the primary component carrier includes a Type 2 power headroom level for the primary component carrier in the MAC control element.

13. A method according to claim 12 wherein the Type I power headroom level is computed as P_cmax,c minus PUSCH power, and wherein the Type 2 power headroom level is computed as P_cmax,c minus PUCCH power minus PUSCH power.

14. A method according to claim 10 wherein providing the plurality of component carriers comprises configuring and/or activating each of the at least one secondary component carriers for uplink transmissions from the wireless terminal to the base station.

15. A method according to claim 10 wherein the Type 1 power headroom reports for each of the at least one secondary component carriers are ordered in consecutive order according to the component carrier indices for the respective secondary component carriers.

16. A method according to claim 15 wherein the Type 2 power headroom report for the primary component carrier precedes the Type 1 power headroom reports for the primary component carrier and each of the at least one secondary component carriers in the MAC control element, and wherein the Type 1 power headroom reports for each of the at least one secondary component carriers are arranged in ascending order according to the component carrier indices for the respective secondary component carriers.

17. The method of claim 10 wherein the at least one secondary component carrier includes first and second secondary component carriers, wherein the MAC control element begins with an eight bit header octet including a five bit Logical Channel Identification (LCID) identifying the MAC control element as providing power headroom reports, wherein the Type 2 power headroom report for the primary component carrier is provided in a first eight bit octet of the MAC control element following the header octet, wherein the Type 1 power headroom report for the primary component carrier is provided in a second 8 bit octet of the MAC control element following the header octet after the Type 2 power headroom report for the primary component carrier, wherein a Type 1 power headroom report for the first secondary component carrier is provided in a third eight bit octet of the MAC control element following the header octet after the Type 1 power headroom report for the primary component carrier, and wherein a Type 1 power headroom report for the second secondary component carrier is provided in a fourth eight bit octet of the MAC control element following the header octet after the Type 1 power headroom report for the first secondary component carrier, and wherein no specific component carrier identifier and no component carrier index is included in the eight bit octets for the Type 1 power headroom reports.

18. The method of claim 17 wherein the MAC control element includes only the eight bit header octet followed by the first eight bit octet for the Type 2 power headroom report for the primary component carrier, the second eight bit octet for the Type 1 power headroom report for the primary component carrier, and respective eight bit octets for each of the Type 1 power headroom reports for the respective secondary component carriers.

19. A wireless terminal comprising:
a processor configured to generate information for uplink transmissions provided over a primary component carrier and at least one secondary component carrier from the wireless terminal to a base station wherein a respective component carrier index is assigned to each of the at least one secondary component carriers provided for the wireless terminal, configured to generate respective power headroom reports for the primary and secondary component carriers, and configured to generate a MAC control element including the power headroom reports for the primary and secondary component carriers, wherein the processor is configured to provide a Type 2 and Type 1 power headroom reports for the primary component carrier first, and then arrange Type 1 power headroom reports for each of the at least one secondary component carriers in an order according to the component carrier indices for the respective secondary component carriers, and wherein no specific component carrier identifier field is included for each of the Type 1 power headroom reports for each of the at least one secondary component carriers; and
a transceiver coupled to the processor wherein the transceiver is configured to transmit the MAC control element including the power headroom reports for the primary and secondary component carriers from the wireless terminal to the base station over one of the component carriers.

20. A wireless terminal according to claim 19 wherein the Type 1 power headroom report for each of the primary and secondary component carriers includes a Type 1 power headroom level for a physical uplink shared channel of the respective component carrier in the MAC control element.

21. A wireless terminal according to claim 19 wherein the Type 2 power headroom report for the primary component carrier includes a Type 2 power headroom level of the primary component carrier in the MAC control element.

22. A wireless terminal according to claim 21 wherein the Type I power headroom level is computed as P_cmax,c minus PUSCH power, and wherein the Type 2 power headroom level is computed as P_cmax,c minus PUCCH power minus PUSCH power.

23. A wireless terminal according to claim 19 wherein each of the at least one secondary component carriers are configured and/or activated for uplink transmissions from the wireless terminal to the base station.

24. A wireless terminal according to claim 19 wherein the processor is further configured to order the Type 1 power headroom reports for each of the at least one secondary component carriers in consecutive order according to the component carrier indices for the respective secondary component carriers.

25. A wireless terminal according to claim 24 wherein the Type 2 power headroom report for the primary component carrier precedes the Type 1 power headroom reports for the primary component carrier and each of the at least one secondary component carriers in the MAC control element, wherein the processor is further configured to arrange the Type 1 power headroom reports for each of the at least one secondary component carriers in ascending order according to the component carrier indices for the respective secondary component carriers.

26. The wireless terminal of claim 19 wherein the at least one secondary component carrier includes first and second secondary component carriers, wherein the MAC control element begins with an eight bit header octet including a five bit Logical Channel Identification (LCID) identifying the MAC control element as providing power headroom reports, wherein the Type 2 power headroom report for the primary component carrier is provided in a first eight bit octet of the MAC control element following the header octet, wherein the Type 1 power headroom report for the primary component carrier is provided in a second 8 bit octet of the MAC control element following the header octet after the Type 2 power headroom report for the primary component carrier, wherein a Type 1 power headroom report for the first secondary component carrier is provided in a third eight bit octet of the MAC control element following the header octet after the Type 1 power headroom report for the primary component carrier, and wherein a Type 1 power headroom report for the second secondary component carrier is provided in a fourth eight bit octet of the MAC control element following the header octet after the Type 1 power headroom report for the first secondary component carrier, and wherein no specific component carrier identifier and no component carrier index is included in the eight bit octets for the Type 1 power headroom reports.

27. The wireless terminal of claim 26 wherein the MAC control element includes only the eight bit header octet followed by the first eight bit octet for the Type 2 power headroom report for the primary component carrier, the second eight bit octet for the Type 1 power headroom report for the primary component carrier, and respective eight bit octets for each of the Type 1 power headroom reports for the respective secondary component carriers.

28. A base station comprising:
an assignment processor configured to provide a primary component carrier and at least one secondary component carrier for uplink communications from the wireless terminal to the base station, wherein a respective component carrier index is assigned to each of the at least one secondary component carriers provided for the wireless terminal; and
RF circuitry coupled to the assignment processor, wherein the RF circuitry is configured to receive a MAC control element including power headroom reports for the primary and secondary component carriers from the wireless terminal over one of the component carriers, wherein a Type 2 and Type 1 power headroom reports for the primary component carrier are provided first, and then Type 1 power headroom reports for each of the at least one secondary component carriers are arranged in an order according to the component carrier indices for the respective secondary component carriers, and wherein no specific component carrier identifier field is included for each of the Type 1 power headroom reports for each of the at least one secondary component carriers;
wherein the assignment processor is further configured to associate each of the power headroom reports of the MAC control element with a respective one of the primary and/or secondary component carriers based on an order in which the power headroom reports are arranged in the MAC control element and based on the component carrier indices assigned to the component carriers.

29. A base station according to claim 28 wherein the Type 1 power headroom report for each of the primary and secondary component carriers includes a Type 1 power headroom level for a physical uplink shared channel of the respective component carrier in the MAC control element.

30. A base station according to claim 29 wherein the Type 2 power headroom report for the primary component carrier includes a Type 2 power headroom level of the primary component carrier in the MAC control element.

31. A base station according to claim 30 wherein the Type I power headroom level is computed as P_cmax,c minus PUSCH power, and wherein the Type 2 power headroom level is computed as P_cmax,c minus PUCCH power minus PUSCH power.

32. A base station according to claim 28 wherein providing the plurality of component carriers comprises configuring and/or activating each of the at least one secondary component carriers for uplink transmissions from the wireless terminal to the base station.

33. A base station according to claim 28 wherein the Type 1 power headroom reports for each of the at least one secondary component carriers are ordered in consecutive order according to the component carrier indices for the respective secondary component carriers.

34. A base station according to claim 33 wherein the Type 2 power headroom report for the primary component carrier precedes the Type 1 power headroom reports for the primary component carrier and each of the at least one secondary component carriers in the MAC control element, wherein the Type 1 power headroom reports for each of the at least one secondary component carriers are arranged in ascending order according to the component carrier indices for the respective secondary component carriers.

35. The base station of claim 28 wherein the at least one secondary component carrier includes first and second secondary component carriers, wherein the MAC control element begins with an eight bit header octet including a five bit Logical Channel Identification (LCID) identifying the MAC control element as providing power headroom reports, wherein the Type 2 power headroom report for the primary component carrier is provided in a first eight bit octet of the MAC control element following the header octet, wherein the Type 1 power headroom report for the primary component carrier is provided in a second 8 bit octet of the MAC control element following the header octet after the Type 2 power headroom report for the primary component carrier, wherein a Type 1 power headroom report for the first secondary component carrier is provided in a third eight bit octet of the MAC control element following the header octet after the Type 1 power headroom report for the primary component carrier, wherein a Type 1 power headroom report for the second secondary component carrier is provided in a fourth eight bit octet of the MAC control element following the header octet after the Type 1 power headroom report for the first secondary component carrier, and wherein no specific component carrier identifier and no component carrier index is included in the eight bit octets for the Type 1 power headroom reports.

36. The base station of claim 35 wherein the MAC control element includes only the eight bit header octet followed by the first eight bit octet for the Type 2 power headroom report for the primary component carrier, the second eight bit octet for the Type 1 power headroom report for the primary component carrier, and respective eight bit octets for each of the Type 1 power headroom reports for the respective secondary component carriers.

* * * * *